(12) United States Patent
Zhang et al.

(10) Patent No.: US 12,309,845 B2
(45) Date of Patent: May 20, 2025

(54) SYSTEM AND METHOD FOR MOBILITY ENHANCEMENTS

(71) Applicant: ZTE CORPORATION, Guangdong (CN)

(72) Inventors: Mengjie Zhang, Shenzhen (CN); He Huang, Shenzhen (CN); Jing Liu, Shenzhen (CN); Li Yang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 470 days.

(21) Appl. No.: 17/934,917

(22) Filed: Sep. 23, 2022

(65) Prior Publication Data
US 2023/0078307 A1    Mar. 16, 2023

Related U.S. Application Data

(63) Continuation of application No. PCT/CN2020/083912, filed on Apr. 9, 2020.

(51) Int. Cl.
*H04W 74/0833*     (2024.01)
*H04W 36/36*     (2009.01)

(52) U.S. Cl.
CPC ..... *H04W 74/0833* (2013.01); *H04W 36/362* (2023.05)

(58) Field of Classification Search
CPC ................. H04L 12/28; H04L 12/50
(Continued)

(56) References Cited

U.S. PATENT DOCUMENTS

| 2018/0279193 A1 | 9/2018 | Park et al. |
| 2019/0223073 A1 | 7/2019 | Chen et al. |
| 2020/0314913 A1* | 10/2020 | Rastegardoost .. H04W 36/0064 |

FOREIGN PATENT DOCUMENTS

| CN | 109152086 A | 1/2019 |
| CN | 110351801 A | 10/2019 |

(Continued)

OTHER PUBLICATIONS

CATT, "Applicability of common F1 interface," 3GPP TSG-RAN WG3 #103bis; R3-191582; Apr. 8-12, 2019; Xi'an, China (12 pages).

(Continued)

*Primary Examiner* — Dang T Ton
(74) *Attorney, Agent, or Firm* — Foley & Lardner LLP

(57) ABSTRACT

A method includes receiving a first radio resource control (RRC) message including at least one of a conditional handover (CHO) configuration and a conditional primary secondary cell addition or change (CPAC) configuration. The CHO configuration includes a CHO configuration index, a CHO candidate cell configuration, and a CHO execution condition. The CPAC configuration includes a CPAC configuration index, a CPAC candidate cell configuration, and a CPAC execution condition. The method includes selecting, responsive to receiving the first RRC message and based on at least one of the CHO execution condition and the CPAC execution condition, a special cell (SpCell) of a wireless communication node to perform a random access procedure (RAP); and transmitting, to the wireless communication node, a second RRC message to inform the wireless communication node that the wireless communication device selected the SpCell to perform the RAP.

20 Claims, 10 Drawing Sheets

(58) Field of Classification Search
USPC .................................. 370/329, 401, 402, 403
See application file for complete search history.

(56) References Cited

FOREIGN PATENT DOCUMENTS

| CN | 110493830 A | 11/2019 |
|---|---|---|
| CN | 110536365 A | 12/2019 |
| CN | 110545567 A | 12/2019 |
| CN | 110622559 A | 12/2019 |
| WO | WO-2019/158801 A1 | 8/2019 |
| WO | WO-2020/068424 A1 | 4/2020 |

OTHER PUBLICATIONS

Ericsson, "TP for 38.331 on Cho," 3GPP TSG-RAN WG2 #108, R2-1914638, Nov. 18-20, 2019; Reno, Nevada, USA (12 pages).
Notice of Reasons for Rejection for JP App. No. 2022-557998 dated Feb. 1, 2024 (with English translation, 8 pages).
First Office Action for CN Appl. No. 202080098115.2, dated Jul. 17, 2024 (with English translation, 16 pages).
Extended European Search Report for EP Appl. No. 20897530.0, dated Oct. 11, 2023 (15 pages).
Nokia et al., "Conditional PSCell addition and change", 3GPP TSG-RAN WG2 Meeting #107bis, R2-1913036, Oct. 18, 2019, Chongqing, China (5 pages).
Qualcomm Incorporated, "On conditional PSCell addition/change", 3GPP TSG-RAN WG4 Meeting #94-e, R4-2000725, Mar. 6, 2020, Online (6 pages).
CATT: "CPAC-F1 impact" 3GPP TSG-RAN WG3 #107-e; R3-200528; Online; Mar. 6, 2020 (10 pages).
Intel Corporation (Summary Rapporteur: Summary of Cho in AI 6.9.3.1 and 6.9.3.3; 3GPP TSG-RAN WG2 Meeting #109e; R2-2002040; Elbonia, Online; Mar. 6, 2020 (18 pages).
International Search Report and Written Opinion for PCT Appl. No. PCT/CN2020/083912 dated Jan. 7, 2021 (8 pages).
Nokia, et al., "(TP for NR BL CR for TS 38.473) UL configuration in Initial UL RRC Message Transfer," 3GPP TSG-RAN WG3#101; R3-184781; Aug 20-24, 2018; Gothenburg, Sweden (8 pages).
Nokia, et al., "MSGA PUSCH LBT failure and PDCCH decoding," 3GPP TSG-RAN WG2 Meeting #109-e; R2-2000851; Feb. 24-Mar. 6, 2020; Online (4 pages).
Office Action on JP App. No. 2022-557998 dated Sep. 19, 2023 (with English translation, 8 pages).
Samsung, "Legacy CFRA and Selection between 2 step and 4 step RA," 3GPP TSG-RA2 108; R2-1914432; Nov. 18-22, 2019; Reno, USA (6 pages).
Samsung, "Remaining issues concerning conditional change (mostly PSCell)," 3GPP TSG-RAN WG2#109e meeting; Tdoc R2-2001163; Feb. 24-Mar. 4, 2020; Online, Greece (24 pages).

\* cited by examiner

600

receiving, by a wireless communication device, a first radio resource control (RRC) message including at least one of a conditional handover (CHO) configuration and a conditional primary secondary cell addition or change (CPAC) configuration, wherein the CHO configuration includes a CHO configuration index, a CHO candidate cell configuration , and a CHO execution condition , wherein the CPAC configuration includes a CPAC configuration index, a CPAC candidate cell configuration, and a CPAC execution condition
602 selecting, by the wireless communication device responsive to receiving the first RRC message and based on at least the CHO execution condition and the CPAC execution condition, a special cell (SpCell) of a wireless communication node to perform a random access procedure (RAP)
604 transmitting, by the wireless communication device to the wireless communication node, a second RRC message to inform the wireless communication node that the wireless communication device selected the SpCell to perform the RAP
606

receiving, by a wireless communication device from a first wireless communication node, a first radio resource control (RRC) message including a conditional primary secondary cell addition or change (CPAC) configuration, wherein the CPAC configuration includes a CPAC configuration index, a CPAC candidate cell configuration, and a CPAC execution condition, wherein the wireless communication device is not configured with a signaling radio bearer (SRB) type corresponding to SRB3
702 selecting, by the wireless communication device and based on the CPAC execution condition, a primary secondary cell (PSCell) residing in a secondary wireless communication node to perform the CPAC
704 transmitting, by the wireless communication device to the first wireless communication node, a second RRC message to inform the first wireless communication node that the wireless communication device selected the secondary wireless communication node to perform the CPAC
706

FIG. 7

900 transmitting, by a wireless communication node to a wireless communication device, a first radio resource control (RRC) message including at least one of a conditional handover (CHO) configuration and a conditional primary secondary cell addition or change (CPAC) configuration, wherein the CHO configuration includes a CHO configuration index, a CHO candidate cell configuration, and a CHO execution condition, wherein the CPAC configuration includes a CPAC configuration index, a CPAC candidate cell configuration, and a CPAC execution condition, wherein the first RRC message causes the wireless communication device to: select, based on at least one of the CHO execution condition and the CPAC execution condition, a special cell (SpCell) of a wireless communication node to perform a random access procedure (RAP), and transmit a second RRC message to the wireless communication node
902 receiving, by the wireless communication node from the wireless communication device, the second RRC message
904 determining, by the wireless communication node, that the wireless communication device selected the SpCell to perform the RAP
906

FIG. 9

1000 transmitting, by a first wireless communication node to a wireless communication device, a first radio resource control (RRC) message including a conditional primary secondary cell addition or change (CPAC) configuration, wherein the CPAC configuration includes a CPAC configuration index, a CPAC candidate cell configuration and a CPAC execution condition, wherein the wireless communication device is not configured with a signaling radio bearer (SRB) type corresponding to SRB3, wherein the first RRC message causes the wireless communication device to: select, based on the CPAC execution condition, a primary secondary cell (PSCell) residing in a secondary wireless communication node to perform the CPAC, and transmit a second RRC message to the wireless communication node
1002 receiving, by the first wireless communication node from the wireless communication device, the second RRC message
1004 determining, by the first wireless communication node, that the wireless communication device selected the secondary wireless communication node to perform the CPAC
1006

FIG. 10

SYSTEM AND METHOD FOR MOBILITY ENHANCEMENTS

CROSS-REFERENCE TO RELATED APPLICATION

This application claims the benefit of priority under 35 U.S.C. § 120 as a continuation of PCT Patent Application No. PCT/CN2020/083912, filed on Apr. 9, 2020, the disclosure of which is incorporated herein by reference in its entirety.

TECHNICAL FIELD

The disclosure relates generally to wireless communications and, more particularly, to systems and methods for mobility enhancements.

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

One aspect disclosed herein is directed to a method for mobility enhancements. The method includes receiving, by a wireless communication device, a first radio resource control (RRC) message (e.g., an RRCReconfiguration message) including at least one of a conditional handover (CHO) configuration and a conditional primary secondary cell addition or change (CPAC) configuration. In some embodiments, the CHO configuration includes a CHO configuration index, a CHO candidate cell configuration, and a CHO execution condition. In some embodiments, the CPAC configuration includes a CPAC configuration index, a CPAC candidate cell configuration, and a CPAC execution condition. In some embodiments, the method includes selecting, by the wireless communication device responsive to receiving the first RRC message and based on at least one of the CHO execution condition and the CPAC execution condition, a special cell (SpCell) of a wireless communication node to perform a random access procedure (RAP). In some embodiments, the method includes transmitting, by the wireless communication device to the wireless communication node, a second RRC message (e.g., an RRCReconfigurationComplete message) to inform the wireless communication node that the wireless communication device selected the SpCell to perform the RAP.

In some embodiments, the second RRC message includes an information element indicating a cell identification information for the selected SpCell. In some embodiments, the cell identification information includes at least one of an SpCell frequency and a physical cell identifier (PCI), a candidate cell identifier, and the CHO or CPAC configuration index.

In some embodiments, the method includes performing, by the wireless communication device toward a distributed unit (DU) of the wireless communication node, the RAP. In some embodiments, the RAP causes the DU to send an F1-C signaling to a central unit (CU) of the wireless communication device. In some embodiments, the F1-C signaling includes an indication of a cell identification information for the selected SpCell.

In some embodiments, the cell identification information corresponds to a cell global identity (CGI) or a cell radio network temporary identifier (C-RNTI).

In some embodiments, the method includes performing, by the wireless communication device toward a distributed unit (DU) of the wireless communication node, the RAP. In some embodiments, the RAP causes the DU to send an F1-U signaling to a central unit (CU) of the wireless communication device. In some embodiments, the F1-U signaling includes an indication of a cell identification information associated with the SpCell.

In some embodiments, the method includes receiving, by a wireless communication device from a first wireless communication node, a first radio resource control (RRC) message including a conditional primary secondary cell addition or change (CPAC) configuration. In some embodiments, the CPAC configuration includes a CPAC configuration index, a CPAC candidate cell configuration, and a CPAC execution condition. In some embodiments, the wireless communication device is not configured with a signaling radio bearer (SRB) type corresponding to SRB3. In some embodiments, the method includes selecting, by the wireless communication device and based on the CPAC execution condition, a primary secondary cell (PSCell) residing in a secondary wireless communication node to perform the CPAC. In some embodiments, the method includes transmitting, by the wireless communication device to the first wireless communication node, a second RRC message (e.g., an MN RRCReconfigurationComplete message) to inform the first wireless communication node that the wireless communication device selected the secondary wireless communication node to perform the CPAC.

In some embodiments, the second RRC message includes an information element indicating a cell identification information for the selected PSCell. In some embodiments, the cell identification information includes at least one of a primary secondary cell (PSCell) frequency and a physical cell identifier (PCI), a candidate cell identifier, and a CPAC configuration index.

In some embodiments, the second RRC message further causes the first wireless communication node to transmit a third RRC message (e.g., SN RRCReconfigurationComplete message) to the secondary wireless communication node based on the cell identification information for the selected PSCell. In some embodiments. In some embodiments, the third RRC message indicates that the wireless communication device has triggered the execution of CPAC.

In some embodiments, the method includes receiving, by a wireless communication device from a first wireless communication node, a radio resource control (RRC) message including a conditional primary secondary cell addition or change (CPAC) configuration. In some embodiments, the CPAC configuration includes a CPAC configuration index, a CPAC candidate cell configuration and a CPAC execution condition. In some embodiments, the wireless communication device is not configured with a signaling radio bearer (SRB) type corresponding to SRB3. In some embodiments, the method includes selecting, by the wireless communication device and based on the CPAC execution condition, a primary secondary cell (PSCell) residing in a secondary wireless communication node to perform the CPAC. In some embodiments, the method includes applying, by the wireless communication device, a CPAC candidate cell configuration for the selected PSCell. In some embodiments, the method includes determining, by the wireless communication device, a signaling radio bearer (SRB) type configured for the selected PSCell. In some embodiments, the method includes performing, by the wireless communication device, a random access procedure (RAP) at a PSCell.

In some embodiments, the SRB type configured for the selected PSCell corresponds to SRB3 and the method includes transmitting, by the wireless communication device to the secondary wireless communication node via SRB3, a second RRC message indicating that the wireless communication device has triggered the execution of CPAC.

In some embodiments, the method includes transmitting, by a wireless communication node to a wireless communication device, a first radio resource control (RRC) message including at least one of a conditional handover (CHO) configuration and a conditional primary secondary cell addition or change (CPAC) configuration. In some embodiments, the CHO configuration includes a CHO configuration index, a CHO candidate cell configuration, and a CHO execution condition. In some embodiments, the CPAC configuration includes a CPAC configuration index, a CPAC candidate cell configuration, and a CPAC execution condition. In some embodiments, the first RRC message causes the wireless communication device to: select, based on at least one of the CHO execution condition and the CPAC execution condition, a special cell (SpCell) of a wireless communication node to perform a random access procedure (RAP), and transmit a second RRC message to the wireless communication node. In some embodiments, the method includes receiving, by the wireless communication node from the wireless communication device, the second RRC message. In some embodiments, the method includes determining, by the wireless communication node, that the wireless communication device selected the SpCell to perform the RAP.

In some embodiments, the second RRC message includes an information element indicating a cell identification information for the selected SpCell, wherein the cell identification information includes at least one of an SpCell frequency and a physical cell identifier (PCI), a candidate cell identifier, and a CHO or CPAC configuration index.

In some embodiments, the first RRC message further causes the wireless communication device to: perform, toward a distributed unit (DU) of the wireless communication node, the RAP. In some embodiments, the RAP causes the DU to send an F1-C signaling to a central unit (CU) of the wireless communication device. In some embodiments, the F1-C signaling includes an indication of a cell identification information for the selected SpCell.

In some embodiments, the cell identification information corresponds to a cell global identity (CGI) or a cell radio network temporary identifier (C-RNTI).

In some embodiments, the first RRC message causes the wireless communication device to: perform, toward a distributed unit (DU) of the wireless communication node, the RAP. In some embodiments, the RAP causes the DU to send an F1-U signaling to a central unit (CU) of the wireless communication device. In some embodiments, the F1-U signaling includes an indication of a cell identification information for the selected SpCell.

In some embodiments, the method includes transmitting, by a first wireless communication node to a wireless communication device, a first radio resource control (RRC) message including a conditional primary secondary cell addition or change (CPAC) configuration. In some embodiments, the CPAC configuration includes a CPAC configuration index, a CPAC candidate cell configuration and a CPAC execution condition. In some embodiments, the wireless communication device is not configured with a signaling radio bearer (SRB) type corresponding to SRB3. In some embodiments, the first RRC message causes the wireless communication device to: select, based on the CPAC execution condition, a primary secondary cell (PSCell) residing in a secondary wireless communication node to perform the CPAC, and transmit a second RRC message to the wireless communication node. In some embodiments, the method includes receiving, by the first wireless communication node from the wireless communication device, the second RRC message. In some embodiments, the method includes determining, by the first wireless communication node, that the wireless communication device selected the secondary wireless communication node to perform the CPAC.

In some embodiments, the second RRC message includes an information element indicating a cell identification information for the selected PSCell. In some embodiments, the cell identification information includes at least one of a primary secondary cell (PSCell) frequency and a physical cell identifier (PCI), a candidate cell identifier, and a candidate CPAC configuration index.

In some embodiments, the method includes transmitting, by the first wireless communication node and based on the cell identification information for the selected PSCell, a third RRC message (e.g., e.g., SN RRCReconfiguration-Complete message) to the secondary wireless communication node, wherein the third RRC message indicates that the wireless communication device has triggered the execution of CPAC.

In some embodiments, the method includes transmitting, by a first wireless communication node to a wireless communication device, a radio resource control (RRC) message including a conditional primary secondary cell addition or change (CPAC) configuration. In some embodiments, the CPAC configuration includes a CPAC configuration index, a CPAC candidate cell configuration, and a CPAC execution condition. In some embodiments, the wireless communication device is not configured with a signaling radio bearer (SRB) type corresponding to SRB3. In some embodiments, the RRC message causes the wireless communication device to: select, based on the CPAC condition, a primary secondary cell (PSCell) residing in a secondary wireless communication node to perform the CPAC, apply a CPAC candidate cell configuration for the selected PSCell, determine a signaling radio bearer (SRB) type configured for the selected PSCell, and perform a random access procedure (RAP) at a PSCell.

In some embodiments, the SRB type configured for the selected PSCell corresponds to SRB3, wherein the RRC message further causes the wireless communication device to: transmit, to the secondary wireless communication node via SRB3, a second RRC message indicating that the wireless communication device has triggered the execution of CPAC, and the method includes receiving, by the secondary wireless communication node via the SRB3, the second RRC message.

The above and other aspects and their embodiments are described in greater detail in the drawings, the descriptions, and the claims.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 6 is a flow diagram depicting a method for improving mobility performance, in accordance with some embodiments of the present disclosure.

FIG. 7 is a flow diagram depicting a method for improving mobility performance, in accordance with some embodiments of the present disclosure.

FIG. 9 is a flow diagram depicting a method for improving mobility performance, in accordance with some embodiments of the present disclosure.

FIG. 10 is a flow diagram depicting a method for improving mobility performance, in accordance with some embodiments of the present disclosure.

DETAILED DESCRIPTION OF EXEMPLARY EMBODIMENTS

Figure 1:
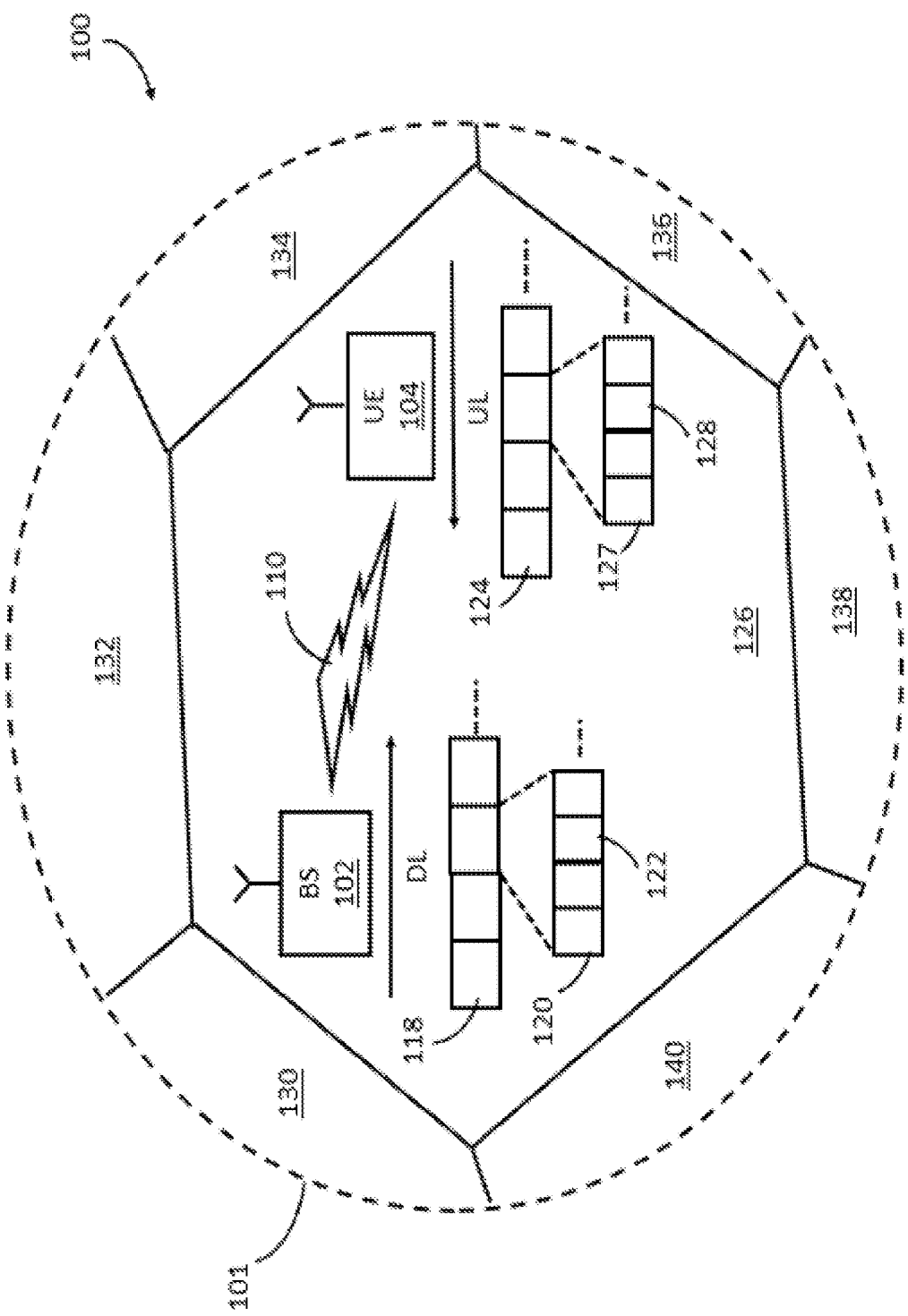
FIG. 1 illustrates an example wireless communication network, and/or system, 100 in which techniques disclosed herein may be implemented, in accordance with an embodiment of the present disclosure.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

The following acronyms are used throughout the present disclosure:
3GPP 3rd Generation Partnership Project
5G 5th Generation Mobile Networks
5G-AN 5G Access Network
5G gNB Next Generation NodeB
C-RNTI Cell Radio Network Temporary Identifier
CE Control Element
CG Configured Grant
CGI Cell Global Identity
CHO Conditional Handover
CPAC Conditional Primary Secondary Cell Addition or Change
CU Central Unit
DCI Downlink Control Information
DG Dynamic Grant
DL Down Link or Downlink
DU Distributed Unit
eMBB Enhanced Mobile Broadband
eNB Evolved Node B
ETSI European Telecommunications Standards Institute
LTE Long Term Evolution
MAC Medium Access Control
MSC Mobile Switching Center
NAS Non-Access Stratum
NR Next Generation RAN
OFDM Orthogonal Frequency-Division Multiplexing
OFDMA Orthogonal Frequency-Division Multiple Access
OSI Open Systems Interconnection
PCell Primary Cell
PCI Physical Cell Identifier
PSCell Primary Secondary Cell
PDCP Packet Data Convergence Protocol
RAN Radio Access Network
RLC Radio Link Control
RRC Radio Resource Control
SDAP Service Data Adaptation Protocol
UE User Equipment
UL Up Link or Uplink Mobility performance is one of the most important performance metrics for long term evolution (LTE) and 5th Generation (5G) new radio (NR). In addition to traditional voice and internet data service, lots of innovative services appear with various quality of service (QoS) requirements in recent years. For example, modern services such as remote control, aerial, industrial automation, industrial control, Augmented Reality (AR) and Virtual Reality (VR) require ultra-reliability and low latency. That is, the mobility performance for such services should be guaranteed with very high reliability (robust) and very low interruption time. For example, a latency target of the interruption time during handover should be as small as possible (e.g., close to 0 ms or 0 ms). Thus, a mechanism is needed for improving the mobility performance to meet the requirements for minimal interruption and high reliability.

Accordingly, the systems and methods discussed herein provide a mechanism for improving the mobility performance to meet the requirements for minimal interruption and high reliability.

That is, as discussed in greater detail below, the present disclosure enhances the conditional handover (CHO) procedure and the conditional primary secondary cell addition or change (CPAC) procedure by providing system and methods for: (1) indicating the selected SpCell to a target gNB-CU in case of a CU/DU split, (2) transferring the SN RRCReconfigurationComplete message to a target SN in the instance that multiple candidate SNs are configured, and (3) directly transferring the SN RRCReconfigurationComplete message to a target PSCell at the execution of CPAC.

1. Mobile Communication Technology and Environment

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
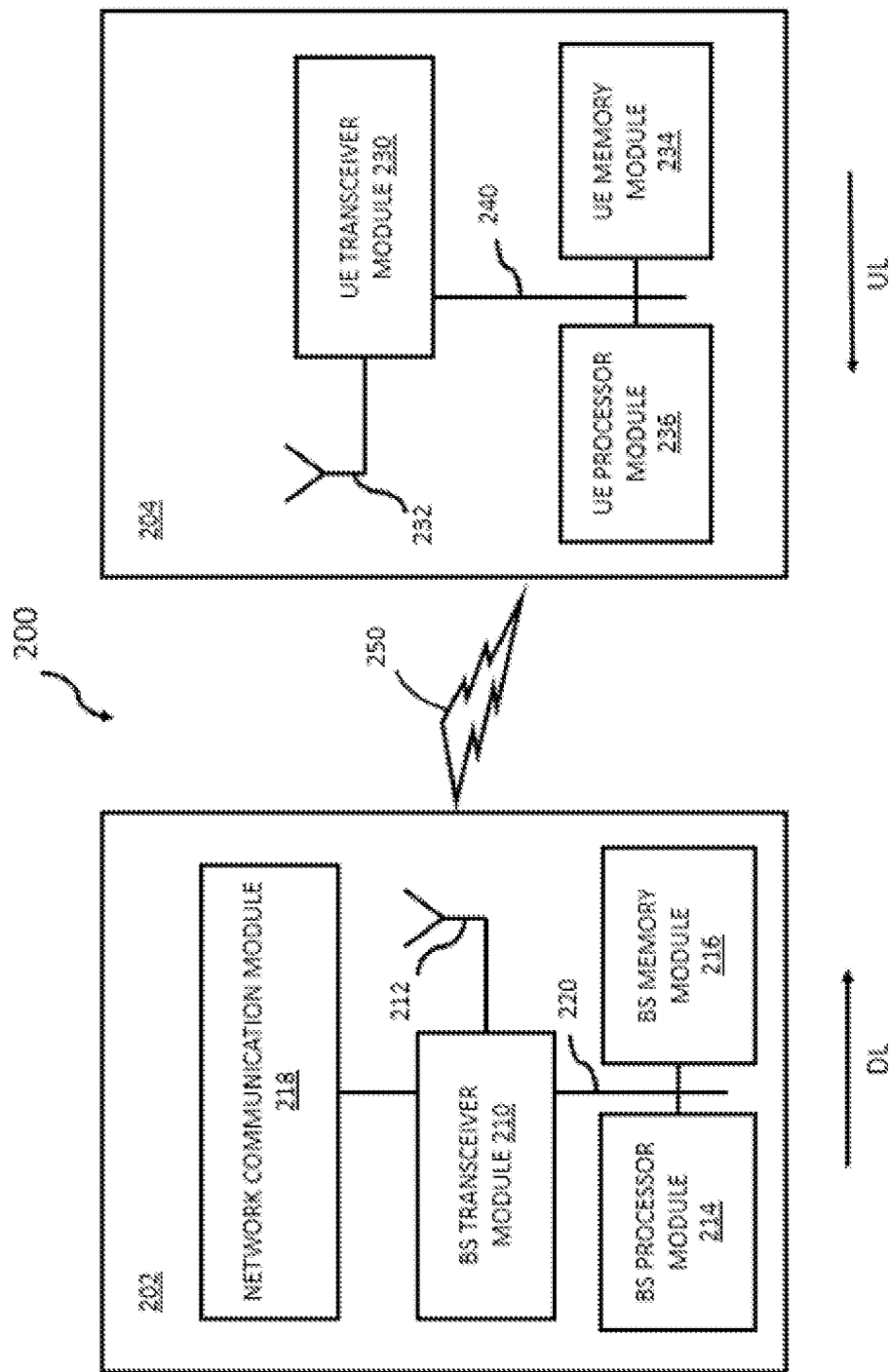
FIG. 2 illustrates a block diagram of an example wireless communication system 200 for transmitting and receiving wireless communication signals (e.g., OFDM/OFDMA signals) in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present disclosure. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

2. Enhancements on CHO/CPAC

To improve mobility reliability (e.g., mobility robust), a Conditional Handover (CHO) procedure is promoted. Conditional Handover is defined as having a configured CHO execution condition that determines when/whether the corresponding handover command is executed. Responsive to receiving the CHO configuration, UE starts to evaluate the condition and only executes the HO command once the condition is met.

Figure 3:
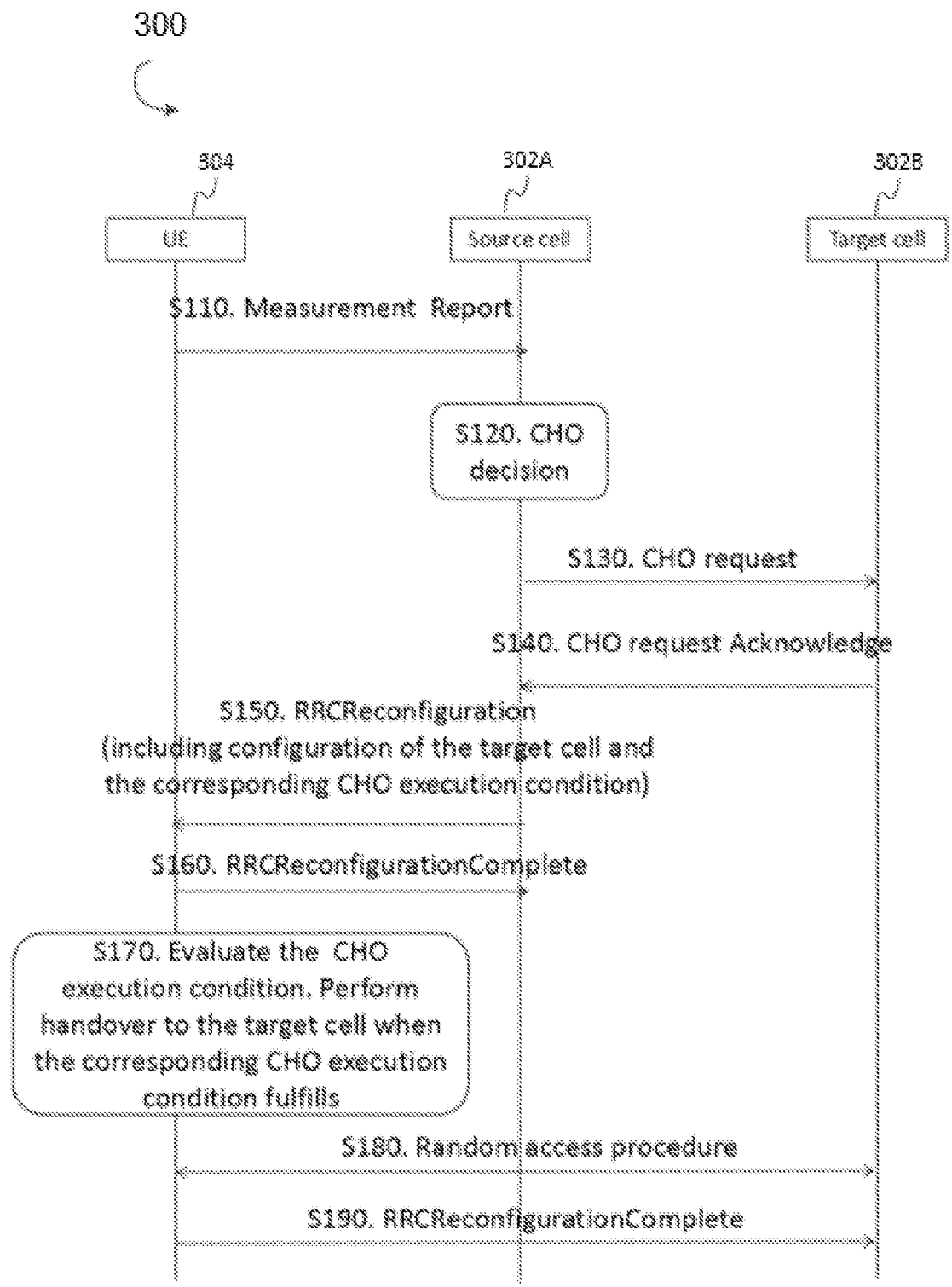
FIG. 3 illustrates a flow diagram of an example CHO procedure, in accordance with some embodiments of the present disclosure.

FIG. 3 illustrates a flow diagram of an example CHO procedure, in accordance with some embodiments of the present disclosure. The example environment 300 includes a UE 304 (e.g., UE 104 in FIG. 1), a source cell 302A (sometimes referred to as, "wireless communication node"), and/or a target cell 302B (sometimes referred to as, "wireless communication node"). In some embodiments, the source cell 302A may be a "first" wireless communication node having identical or similar functionality as the BS 102 in FIG. 1 and the target cell 302B may be a "second" wireless communication node having identical or similar functionality as the BS 102 in FIG. 1.

At operation S110, the UE 304 may send (e.g., transmit, deliver, etc.) a message (labeled in FIG. 3 as, "S110 Measurement Report) to the source cell 302A to report the measurement result of the target cell 302B. At operation S120, the source cell 302A makes a decision on the usage of CHO to handoff the UE based on the Measurement Report information or RRM information. At operation S130, the source cell 302A sends a CHO request (labeled in FIG. 3 as, "S130. CHO request") to the target cell 302B. At operation S140, the target cell 302B sends a message (labeled in FIG. 3 as, "CHO request Acknowledge") to the source cell 302A.

At operation S150, the source cell 302A sends a message (labeled in FIG. 3. as, "RRCReconfiguration") to the UE 304, where the message includes a CHO configuration. In some embodiments, the CHO configuration may include the configuration of the target cell 302B and/or the corresponding CHO execution condition of the target cell 302B.

At operation S160, the UE 304 sends a message (labeled in FIG. 3 as, "RRCReconfigurationComplete") to the source cell 302A. At operation S170, the UE 304 maintains a connection with the source cell 302A after receiving the CHO configuration, and starts to evaluate the CHO execution condition for the target cell 302B. At operation S180, if the CHO execution condition is fulfilled (e.g., satisfied, met, achieved, etc.), then the UE 304 performs a handover to the target cell 302B and applies the corresponding configuration received at operation S150. At operation S180, the UE 304 accesses the target cell 302B. At operation S190, the UE 304 sends a message (labeled in FIG. 3 as, "RRCReconfigurationComplete") to the target cell 302B.

The UE 304 in the wireless network can operate in Dual Connectivity, including intra-E-UTRA DC or Multi-Radio DC (MR-DC). In case of intra-E-UTRA DC, both the MN and SN may provide E-UTRA access. While in case of MR-DC, one node provides NR access and the other one provides either E-UTRA or NR access. One or multiple serving cells can be configured both on MN and SN. Serving cells configured on MN are defined as a Master Cell Group (MCG) while serving cells configured on SN are defined as a Secondary Cell Group (SCG). In each cell group, there's one primary cell and the others are secondary cell. The primary cell in the MCG is denoted as PCell while the primary cell in the SCG is denoted as PSCell. When operating in DC, a Radio Bearer (RB) can be configured to utilize either the MCG resources (MCG bearer) or SCG resources (MCG bearer) or both MCG and SCG resources (split bearer).

Figure 4:
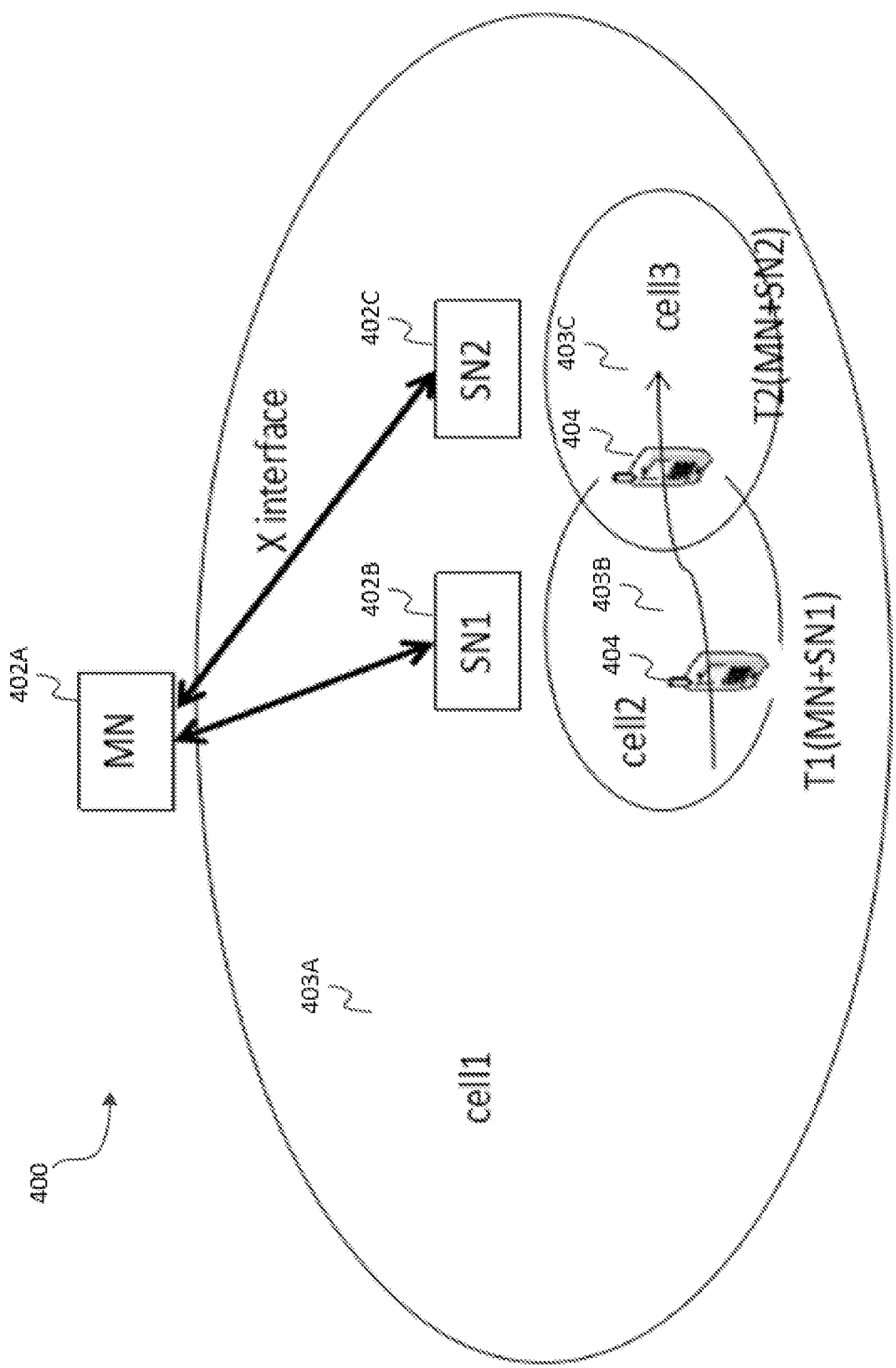
FIG. 4 illustrates a block diagram of an example 5G environment for a secondary node (SN) change, in accordance with some embodiments of the present disclosure.

FIG. 4 illustrates a block diagram of an example 5G environment for a secondary node (SN) change, in accordance with some embodiments of the present disclosure. The example environment 400 includes a UE 404, a master node 402A (shown in FIG. 4 as "MN"), a "first" secondary wireless communication node 402B (shown in FIG. 4 as "SN1"), and a "second" secondary wireless communication node 402C (shown in FIG. 4 as "SN2"). In some embodiments, any of the MN 402A, the SN 402B, and the SN 402C may be a BS 102 in FIG. 1.

Cell 403A (shown in FIG. 4 as, "cell1"), Cell 403B (shown in FIG. 4 as, "cell2"), and Cell 403C (shown in FIG. 4 as, "cell3") are the corresponding cells generated by MN 402A, SN 402B and SN 402C respectively. X interfaces may be deployed between MN 402A and SN 402B, and SN 402C respectively. At time T1, the UE 404 is operating in DC between MN 402A and SN 402B. With the movement of the UE 404, at time T2, the SN is changed from SN 402B to SN 402C. The SN change can be initiated either by the MN 402A or the source SN.

To improve mobility reliability (i.e., mobility robust) in case of SN change or SN addition, a Conditional PSCell Addition and PSCell Change (CPAC) may also be promoted. Similar to CHO, CPAC is defined as having a configured CPAC execution condition that determines when and/or whether the corresponding PSCell addition/change command is executed. Responsive to receiving the CPAC configuration, the UE 404, in some embodiments, starts to evaluate the condition and only executes the CPAC command once the condition is met.

3. How to Indicate the Selected SpCell to the Target gNB-CU

Figure 5:
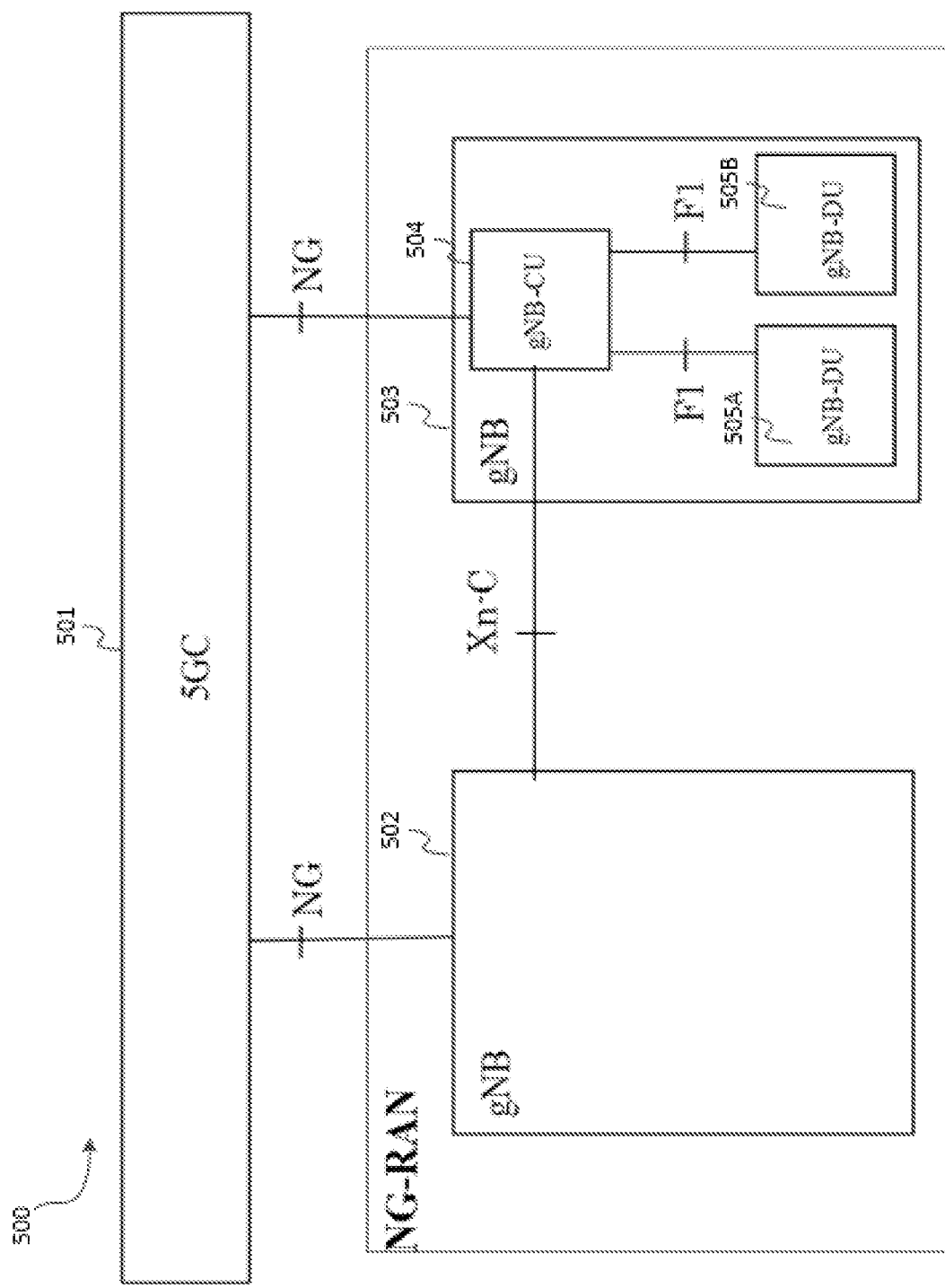
FIG. 5 illustrates a block diagram of an example wireless communication node configured for a central unit (CU)/distributed unit (DU) split structure, in accordance with some embodiments of the present disclosure.

FIG. 5 illustrates a block diagram of an example environment of a 5GC system supporting a wireless communication node having a central unit (CU)/distributed unit (DU) split architecture, in accordance with some embodiments of the present disclosure. In case of CHO/CPAC, a target node can be a CU/DU split structure. The environment 550 includes a 5GC system 501 that is coupled to a gNB 503 (e.g., a target node). The gNB 503 includes of a gNB Central Unit (gNB-CU) 504 and one or more gNB Distributed Units (gNB-DU) 505A, 505B (collectively referred to as, "gNB-DU 505"). The gNB-CU 504 and a gNB-DU 505 are connected via an F1 interface. The gNB-CU 504 may be defined as a logical node hosting RRC, SDAP and PDCP protocols of the gNB 503 or RRC and PDCP protocols of the en-gNB that controls the operation of one or more gNB-DUs 505. The gNB-DU 505 may be defined as a logical node hosting RLC, MAC and PHY layers of the gNB 503 (sometimes referred to as, "en-gNB"), and its operation may be partly controlled by gNB-CU 504. One gNB-DU 505 may support one or multiple cells. One cell may be supported by only one gNB-DU 505.

In case of CHO/CPAC, multiple candidate SpCells (e.g., PCell and/or PSCell) can be resided in one target node. For example, multiple candidate SpCells may belong to one gNB-CU, but links (e.g., connect, associate, attach, etc.) to one or more gNB-DUs 505. Responsive to triggering the execution of CHO/CPAC, the UE (e.g., UE 104 in FIG. 1) may perform a random access procedure (RAP) to the selected (e.g., target cell) SpCell resided in the target gNB-DU 505 and/or send (e.g., transmit, deliver, etc.) the RRCReconfigurationComplete message to the target SpCell if there is a Signal Radio Bearer (SRB) located in the target node (e.g., SRB1, SRB3, etc.), as shown in operations S180 and S190 in FIG. 3. The target gNB-DU 505 may send the UL RRC MESSAGE TRANSFER to transfer the RRCReconfigurationComplete message (if any) to the gNB-CU 504 over the F1 interface.

However, in some embodiments, no SpCell index is included in the existing UL RRC MESSAGE TRANSFER or RRCReconfigurationComplete message. As such, the target gNB-CU 504 may have no idea as to which candidate SpCell is selected by the UE.

In order to inform the target gNB-CU about the selected SpCell, there are several alternatives that may be considered as follows:

3.1 RRC Message-Based Method

The UE may send an RRC complete message including the indication of selected cell identification information (e.g., target SpCell frequency and PCI; candidate cell ID; candidate CHO/CPAC configuration index) to the BS. For example, the RRC complete message may include the indication as one information element in the RRCReconfigurationComplete message.

3.1.1. Example Embodiment(s)

In some embodiments (sometimes referred to as, "Embodiment 1a"), responsive to triggering the execution of CHO, the UE may send an RRCReconfigurationComplete message including the indication of the selected PCell information (e.g., target PCell frequency+PCI; candidate cell ID; candidate CHO configuration index) to the target gNB-DU. The target gNB-DU may send an UL RRC MESSAGE TRANSFER message to the target gNB-CU to convey the received RRCReconfigurationComplete message.

In some embodiments (sometimes referred to as, "Embodiment 1b"), responsive to triggering the execution of CPAC, the UE may send an RRCReconfigurationComplete message including the indication of the selected PSCell information (e.g., target PSCell frequency+PCI; candidate cell ID; candidate CPAC configuration index) to the target SN gNB-DU. The target SN gNB-DU may send a UL RRC MESSAGE TRANSFER message to the target SN gNB-CU to convey the received RRCReconfigurationComplete message.

In some embodiments (sometimes referred to as, "Embodiment 1c"), responsive to triggering the execution of CPAC, the UE may send a MN RRC complete message (e.g., RRCReconfigurationComplete/RRCConnectionReconfigurationComplete, or ULInformationTransferMRDC) including an embedded SN RRCReconfigurationComplete message to the MN. The indication of the selected PSCell information (e.g. target PSCell frequency+target PSCell PCI; candidate cell ID; candidate CPAC configuration index) may be included in the SN RRCReconfigurationComplete message. The MN may send the SN RRCReconfigurationComplete message to the target SN gNB-CU via X2/Xn signaling.

3.2 F1-C Signaling Based Method

Responsive to performing (e.g., executing, implementing, conducing, etc.) a Random Access Procedure (RAP) at the target gNB-DU, the target gNB-DU may send a F1-C signaling including the indication of selected cell identification information (e.g., target SpCell frequency+PCI; candidate cell ID; candidate CHO configuration index; CGI; C-RNTI) to the target gNB-CU, i.e. include the indication as one information element in the UL RRC MESSAGE TRANSFER message.

3.2.1. Example Embodiment(s)

In some embodiments (sometimes referred to as, "Embodiment 2a"), responsive to triggering the execution of CHO, the UE may send an RRCReconfigurationComplete message to the target gNB-DU. The target gNB-DU may send an UL RRC MESSAGE TRANSFER message including the indication of selected PCell information (e.g., target PCell frequency+PCI; candidate cell ID; candidate CHO configuration index; CGI; C-RNTI) to the target gNB-CU to convey the received RRCReconfigurationComplete message.

In some embodiments (sometimes referred to as, "Embodiment 2b"), responsive triggering the execution of CPAC, the UE may send an RRCReconfigurationComplete message to the target SN gNB-DU. The target SN gNB-DU may send an UL RRC MESSAGE TRANSFER message including the indication of selected PSCell information (e.g., target PSCell frequency+PCI; candidate cell ID; candidate CHO configuration index; CGI; C-RNTI) to the target SgNB-CU to convey the received RRCReconfigurationComplete message.

3.3. F1-U Signaling Based Method

Responsive to performing a RAP at the target gNB-DU, the target gNB-DU may send a F1-U signaling including the indication of selected cell identification information (e.g., target SpCell frequency+PCI; candidate cell ID; candidate CHO configuration index; CGI; C-RNTI) to the target gNB-CU via F1-U signaling. For example the F1-U signaling may include the indication as one information element in the DL DATA DELIVERY STATUS (DDDS) message.

3.3.1. Example Embodiment(s)

In some embodiments (sometimes referred to as, "Embodiment 3a"), responsive to triggering the execution of CHO, the UE may perform a RAP towards the target gNB-DU. A RAP may be performed at the target gNB-DU. The target gNB-DU may send a DDDS frame including the indication of selected PCell information (e.g., target PCell frequency+PCI; candidate cell ID; candidate CHO configuration index; CGI; C-RNTI) to inform the target gNB-CU.

In some embodiments (sometimes referred to as, "Embodiment 3b"), responsive to triggering the execution of CPAC, the UE may perform a RAP towards the target SN gNB-DU. A RAP may be performed at the target SN gNB-DU. The target SN gNB-DU may send a DDDS frame including the indication of selected PSCell information (e.g., target PCell frequency+PCI; candidate cell ID; candidate CHO configuration index; CGI; C-RNTI) to inform the target SN gNB-CU.

3.4. Text Based Method

The target gNB-CU and gNB-DU may allocate (e.g., assign, distribute, etc.) an individual transport network layer (TNL) address information for F1-U interface of each candidate SpCell in the handover preparation phase.

3.4.1. Example Embodiment(s)

In some embodiments (sometimes referred to as, "Embodiment 4a"), responsive to receiving the CHO request from the source node, the target gNB-CU and/or gNB-DU may allocate an individual TNL address information for F1-U interface of each candidate PCell. A RAP may be performed at the target gNB-DU. The target gNB-DU may send a DDDS frame to inform the target gNB-CU. The target gNB-CU can infer the selected PCell from the TNL address of DDDS.

In some embodiments (sometimes referred to as, "Embodiment 4b"), responsive to receiving the CPAC request from the source SN, the target SN gNB-CU and/or gNB-DU may allocate an individual TNL address information for F1-U interface of each candidate PSCell. A RAP may be performed at the target SN gNB-DU. The target SN gNB-DU may send a DDDS frame to inform the target SN gNB-CU. The target SN gNB-CU can infer the selected PSCell from the TNL address of DDDS.

3.5. Methods for Implementing the Example Embodiment(s)

FIG. 6 is a flow diagram depicting a method for improving mobility performance, in accordance with some embodiments of the present disclosure. Additional, fewer, or different operations may be performed in the method depending on the particular embodiment. In some embodiments, some or all operations of method 600 may be performed by a wireless communication node, such as BS 102 in FIG. 1. In some operations, some or all operations of method 600 may be performed by a wireless communication device, such as UE 104 in FIG. 1. Each operation may be re-ordered, added, removed, or repeated.

As shown, the method 600 includes, in some embodiments, the operation 602 of receiving, by a wireless communication device, first radio resource control (RRC) message including at least one of a conditional handover (CHO) configuration and a conditional primary secondary cell addition or change (CPAC) configuration, wherein the CHO configuration includes a CHO configuration index, a CHO candidate cell configuration, and a CHO execution condition, wherein the CPAC configuration includes a CPAC configuration index, a CPAC candidate cell configuration, and a CPAC execution condition. The method includes, in some embodiments, the operation 604 of selecting, by the wireless communication device responsive to receiving the first RRC message and based on at least the CHO execution condition and the CPAC execution condition, a special cell (SpCell) of a wireless communication node to perform a random access procedure (RAP). The method includes, in some embodiments, the operation 606 of transmitting, by the wireless communication device to the wireless communication node, a second RRC message to inform the wireless communication node that the wireless communication device selected the SpCell to perform the RAP.

FIG. 7 is a flow diagram depicting a method for improving mobility performance, in accordance with some embodiments of the present disclosure. Additional, fewer, or different operations may be performed in the method depending on the particular embodiment. In some embodiments, some or all operations of method 700 may be performed by a wireless communication node, such as BS 102 in FIG. 1. In some operations, some or all operations of method 700 may be performed by a wireless communication device, such as UE 104 in FIG. 1. Each operation may be re-ordered, added, removed, or repeated.

As shown, the method 700 includes, in some embodiments, the operation 702 of receiving, by a wireless communication device from a first wireless communication node, a first radio resource control (RRC) message including a conditional primary secondary cell addition or change (CPAC) configuration, wherein the CPAC configuration includes a CPAC configuration index, a CPAC candidate cell configuration, and a CPAC execution condition, wherein the wireless communication device is not configured with a signaling radio bearer (SRB) type corresponding to SRB3. The method includes, in some embodiments, the operation 704 of selecting, by the wireless communication device and based on the CPAC execution condition, a primary secondary cell (PSCell) residing in a secondary wireless communication node to perform the CPAC. The method includes, in some embodiments, the operation 706 of transmitting, by the wireless communication device to the first wireless communication node, a second RRC message to inform the first wireless communication node that the wireless communication device selected the secondary wireless communication node to perform the CPAC.

Figure 8:
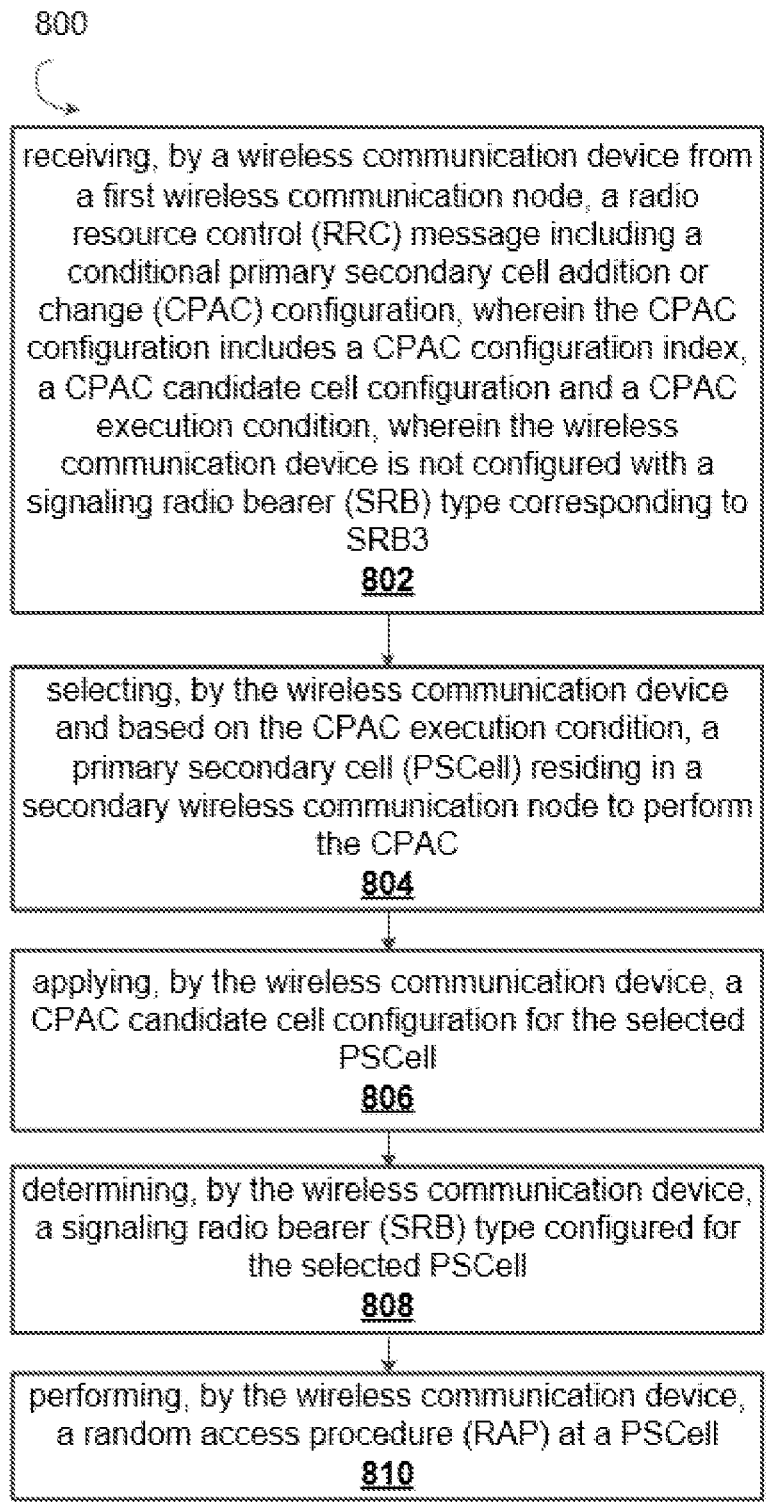
FIG. 8 is a flow diagram depicting a method for improving mobility performance, in accordance with some embodiments of the present disclosure.

FIG. 8 is a flow diagram depicting a method for improving mobility performance, in accordance with some embodiments of the present disclosure. Additional, fewer, or different operations may be performed in the method depending on the particular embodiment. In some embodiments, some or all operations of method 800 may be performed by a wireless communication node, such as BS 102 in FIG. 1. In some operations, some or all operations of method 800 may be performed by a wireless communication device, such as UE 104 in FIG. 1. Each operation may be re-ordered, added, removed, or repeated.

As shown, the method 800 includes, in some embodiments, the operation 802 of receiving, by a wireless communication device from a first wireless communication node, a radio resource control (RRC) message including a conditional primary secondary cell addition or change (CPAC) configuration, wherein the CPAC configuration includes a CPAC configuration index, a CPAC candidate cell configuration and a CPAC execution condition, wherein the wireless communication device is not configured with a signaling radio bearer (SRB) type corresponding to SRB3. The method includes, in some embodiments, the operation 804 of selecting, by the wireless communication device and based on the CPAC execution condition, a primary secondary cell (PSCell) residing in a secondary wireless communication node to perform the CPAC. The method includes, in some embodiments, the operation 806 of applying, by the wireless communication device, a CPAC candidate cell configuration for the selected PSCell. The method includes, in some embodiments, the operation 808 of determining, by the wireless communication device, a signaling radio bearer (SRB) type configured for the selected PSCell. The method includes, in some embodiments, the operation 810 of performing, by the wireless communication device, a random access procedure (RAP) at a PSCell.

4. How to Transfer Messages to a Target SN

In case of CPAC, the UE may send a MN RRC complete message (e.g., RRCReconfigurationComplete/RRCConnectionReconfigurationComplete, or ULInformationTransferMRDC) including an embedded SN RRC complete message (e.g., RRCReconfigurationComplete) to the MN at configuration of CPAC and execution of CPAC when no SRB3 is configured. Responsive to receiving the MN RRC complete message, the MN may inform the target SN.

However, if multiple candidate SNs are configured for CPAC, then the MN may have no idea as to which candidate SN should be informed.

In order to inform the MN about the selected candidate SN, the UE sends a MN RRC complete message (e.g., RRCReconfigurationComplete/RRCConnectionReconfigurationComplete, or ULInformationTransferMRDC) including the indication of the selected cell information (e.g., target PSCell frequency+PCI; candidate cell ID; candidate CHO/CPAC configuration index) to the MN. For example, the MN RRC complete message may include the indication as one information element in the RRC complete message. The MN may send the SN RRCReconfigurationComplete message to the corresponding SN according to the indicated cell information.

4.1 Example Embodiment(s): UE Messaging Responsive to Configuration of CPAC The MN may send an RRCReconfiguration message with CPAC configuration to the UE. The CPAC configuration may include the configuration of the target PSCell and/or the corresponding CPAC execution condition of the target PSCell.

Responsive to receiving the RRCReconfiguration message, the UE sends a MN RRC complete message (e.g., RRCReconfigurationComplete/RRCConnectionReconfigurationComplete, or ULInformationTransferMRDC) including one or more embedded SN RRCReconfigurationComplete messages to the MN. That is, each embedded SN RRCReconfigurationComplete may be linked with an indication of the cell information (e.g., target PSCell frequency+ PCI; candidate cell ID; candidate CHO/CPAC configuration index).

The MN may transfer the SN RRCReconfigurationComplete message to the corresponding SN according to the indicated cell information.

4.2. Example Embodiment(s): UE Messaging Responsive to Execution of CPAC

Responsive to triggering the execution of CPAC (i.e., the corresponding execution condition is met), the UE may send a MN RRC complete message (e.g., RRCReconfigurationComplete/RRCConnectionReconfigurationComplete, or ULInformationTransferMRDC) including an embedded SN RRCReconfigurationComplete message to the MN, which also may include the indication of the selected cell information (e.g., target PSCell frequency+PCI; candidate cell ID; candidate CHO/CPAC configuration index).

The MN may transfer the SN RRCReconfigurationComplete message to the corresponding SN according to the indicated cell information.

4.3. Methods for Implementing the Example Embodiment(s)

FIG. 9 is a flow diagram depicting a method for improving mobility performance, in accordance with some embodiments of the present disclosure. Additional, fewer, or different operations may be performed in the method depending on the particular embodiment. In some embodiments, some or all operations of method 900 may be performed by a wireless communication node, such as BS 102 in FIG. 1. In some operations, some or all operations of method 900 may be performed by a wireless communication device, such as UE 104 in FIG. 1. Each operation may be re-ordered, added, removed, or repeated.

As shown, the method 900 includes, in some embodiments, the operation 902 of transmitting, by a wireless communication node to a wireless communication device, a first radio resource control (RRC) message including at least one of a conditional handover (CHO) configuration and a conditional primary secondary cell addition or change (CPAC) configuration, wherein the CHO configuration includes a CHO configuration index, a CHO candidate cell configuration, and a CHO execution condition, wherein the CPAC configuration includes a CPAC configuration index, a CPAC candidate cell configuration, and a CPAC execution condition, wherein the first RRC message causes the wireless communication device to: select, based on at least one of the CHO execution condition and the CPAC execution condition, a special cell (SpCell) of a wireless communication node to perform a random access procedure (RAP), and transmit a second RRC message to the wireless communication node. The method includes, in some embodiments, the operation 904 of receiving, by the wireless communication node from the wireless communication device, the second RRC message. The method includes, in some embodiments, the operation 906 of determining, by the wireless communication node, that the wireless communication device selected the SpCell to perform the RAP.

FIG. 10 is a flow diagram depicting a method for improving mobility performance, in accordance with some embodiments of the present disclosure. Additional, fewer, or different operations may be performed in the method depending on the particular embodiment. In some embodiments, some or all operations of method 1000 may be performed by a wireless communication node, such as BS 102 in FIG. 1. In some operations, some or all operations of method 1000 may be performed by a wireless communication device, such as UE 104 in FIG. 1. Each operation may be re-ordered, added, removed, or repeated.

As shown, the method 1000 includes, in some embodiments, the operation 1002 of transmitting, by a first wireless communication node to a wireless communication device, a first radio resource control (RRC) message including a conditional primary secondary cell addition or change (CPAC) configuration, wherein the CPAC configuration includes a CPAC configuration index, a CPAC candidate cell configuration and a CPAC execution condition, wherein the wireless communication device is not configured with a signaling radio bearer (SRB) type corresponding to SRB3, wherein the first RRC message causes the wireless communication device to: select, based on the CPAC execution condition, a primary secondary cell (PSCell) residing in a secondary wireless communication node to perform the CPAC, and transmit a second RRC message to the wireless communication node. The method includes, in some embodiments, the operation 1004 of receiving, by the first wireless communication node from the wireless communication device, the second RRC message. The method includes, in some embodiments, the operation 1006 of determining, by the first wireless communication node, that the wireless communication device selected the secondary wireless communication node to perform the CPAC.

5. How to Directly Transfer Messaging to a Target PSCell

When no SRB3 is configured, the SN RRCReconfiguration message may be embedded in the MN RRCReconfiguration/RRCConnectionReconfiguration message to transfer to the UE. At the execution of CPAC, the UE may apply the new configuration for the target PSCell, perform RAP to the target PSCell, and/or send the RRCReconfigurationComplete message to the target PSCell via SRB3 if the SRB3 is configured for the target PSCell.

5.1. Example Embodiment(s)

The MN may send an RRCReconfiguration message with CPAC configuration to the UE. The CPAC configuration may include the configuration of the target cell and/or the corresponding CPAC execution condition of the target cell.

Responsive to receiving the RRCReconfiguration message, the UE sends a MN RRC complete message (e.g., RRCReconfigurationComplete/RRCConnectionReconfigurationComplete, or ULInformationTransferMRDC) including an embedded SN RRCReconfigurationComplete messages to the MN.

The UE may start to evaluate the CPAC execution condition for the target PSCell. If the CPAC execution condition is fulfilled, then the UE may apply the corresponding CPAC configuration and/or perform a RAP towards the target PSCell.

The UE may send an RRCReconfigurationComplete message to the target PSCell via SRB3 if SRB3 is configured.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program (e.g., a computer program product) or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:
receiving, by a wireless communication device, a first radio resource control (RRC) message including a conditional handover (CHO) configuration, wherein the CHO configuration includes a CHO configuration index, a CHO candidate cell configuration, and a CHO execution condition;
selecting, by the wireless communication device responsive to receiving the first RRC message and based on the CHO execution condition, a special cell (SpCell) of a wireless communication node to perform a random access procedure (RAP); and
transmitting, by the wireless communication device to the wireless communication node, a second RRC message.

2. The method of claim 1, further comprising:
performing, by the wireless communication device toward a distributed unit (DU) of the wireless communication node, the RAP, wherein the RAP causes the DU to send an F1-C signaling to a central unit (CU) of the wireless communication node, wherein the F1-C signaling includes an indication of a cell identification information for the selected SpCell.

3. The method of claim 2, wherein the cell identification information corresponds to a cell global identity (CGI) or a cell radio network temporary identifier (C-RNTI).

4. A method comprising:
receiving, by a wireless communication device from a first wireless communication node, a first radio resource control (RRC) message including a conditional primary secondary cell addition or change (CPAC) configuration, wherein the CPAC configuration includes a CPAC configuration index, a CPAC candidate cell configuration, and a CPAC execution condition;
selecting, by the wireless communication device based on the CPAC execution condition, a primary secondary cell (PSCell) residing in a secondary wireless communication node to perform the CPAC; and
transmitting, by the wireless communication device to the first wireless communication node, a second RRC message to inform the first wireless communication node that the wireless communication device selected the secondary wireless communication node to perform the CPAC.

5. The method of claim 4, wherein the second RRC message includes an information element indicating a cell identification information for the selected PSCell, wherein the cell identification information includes at least one of a primary secondary cell (PSCell) frequency, a physical cell identifier (PCI), a candidate cell identifier, or a CPAC configuration index.

6. The method of claim 4, wherein the second RRC message further causes the first wireless communication node to transmit a third RRC message to the secondary wireless communication node based on the cell identification information for the selected PSCell, wherein the third RRC message indicates that the wireless communication device has triggered the execution of the CPAC.

7. The method of claim 4, further comprising:
performing, by the wireless communication device toward a distributed unit (DU) of the secondary wireless communication node, a random access procedure (RAP), wherein the RAP causes the DU to send an F1-C signaling to a central unit (CU) of the secondary wireless communication node, wherein the F1-C signaling includes an indication of a cell identification information for a selected cell.

8. The method of claim 7, wherein the cell identification information corresponds to a cell global identity (CGI) or a cell radio network temporary identifier (C-RNTI).

9. A method comprising:
transmitting, by a wireless communication node to a wireless communication device, a first radio resource control (RRC) message including a conditional handover (CHO) configuration, wherein the CHO configuration includes a CHO configuration index, a CHO candidate cell configuration, and a CHO execution condition,
wherein the wireless communication device selects, based on the CHO execution condition, a special cell (SpCell) of a wireless communication node to perform a random access procedure (RAP), and transmit a second RRC message to the wireless communication node; and
receiving, by the wireless communication node from the wireless communication device, the second RRC message.

10. The method of claim 9, wherein the wireless communication device performs, toward a distributed unit (DU) of the wireless communication node, the RAP, wherein the RAP causes the DU to send an F1-C signaling to a central unit (CU) of the wireless communication node, wherein the F1-C signaling includes an indication of a cell identification information for the selected SpCell.

11. The method of claim 10, wherein the cell identification information corresponds to a cell global identity (CGI) or a cell radio network temporary identifier (C-RNTI).

12. A method comprising:
transmitting, by a first wireless communication node to a wireless communication device, a first radio resource control (RRC) message including a conditional primary secondary cell addition or change (CPAC) configuration, wherein the CPAC configuration includes a CPAC configuration index, a CPAC candidate cell configuration and a CPAC execution condition,
wherein the wireless communication device selects, based on the CPAC execution condition, a primary secondary cell (PSCell) residing in a secondary wireless communication node to perform the CPAC, and transmits a second RRC message to the wireless communication node; and
receiving, by the first wireless communication node from the wireless communication device, the second RRC message to inform the first wireless communication node that the wireless communication device selected the secondary wireless communication node to perform the CPAC.

13. The method of claim 12, wherein the second RRC message includes an information element indicating a cell identification information for the selected PSCell, wherein the cell identification information includes at least one of a primary secondary cell (PSCell) frequency, a physical cell identifier (PCI), a candidate cell identifier, or a candidate CPAC configuration index.

14. The method of claim 13, further comprising:
transmitting, by the first wireless communication node and based on the cell identification information for the selected PSCell, a third RRC message to the secondary wireless communication node, wherein the third RRC message indicates that the wireless communication device has triggered the execution of the CPAC.

15. The method of claim 12, wherein the wireless communication device performs toward a distributed unit (DU) of the secondary wireless communication node, a random access procedure (RAP), wherein the RAP causes the DU to send an F1-C signaling to a central unit (CU) of the secondary wireless communication node, wherein the F1-C signaling includes an indication of a cell identification information for a selected cell.

16. The method of claim 15, wherein the cell identification information corresponds to a cell global identity (CGI) or a cell radio network temporary identifier (C-RNTI).

17. A non-transitory computer program product comprising a computer-readable program medium code stored thereupon, the code, when executed by a processor, causing the processor to implement the method of claim 1.

18. A non-transitory computer program product comprising a computer-readable program medium code stored thereupon, the code, when executed by a processor, causing the processor to implement the method of claim 2.

19. A non-transitory computer program product comprising a computer-readable program medium code stored thereupon, the code, when executed by a processor, causing the processor to implement the method of claim 4.

20. A non-transitory computer program product comprising a computer-readable program medium code stored thereupon, the code, when executed by a processor, causing the processor to implement the method of claim 5.

* * * * *